(12) United States Patent
Dow et al.

(10) Patent No.: US 9,930,134 B2
(45) Date of Patent: Mar. 27, 2018

(54) FILE REPLICATION ON LOCATION-AWARE DEVICES

(71) Applicant: International Business Machines Corporation, Armonk, NY (US)

(72) Inventors: Andrew Dow, Laguna Niguel, CA (US); Eli M. Dow, Wappingers Falls, NY (US); Maurice M. Materise, Poughkeepsie, NY (US); Katrin Nagel, Hannover (DE); Nickalaus A. Painter, Constableville, NY (US); Jairo A. Pava, Miami, FL (US); Salma Y. Rodriguez, Miami Beach, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/952,024

(22) Filed: Nov. 25, 2015

(65) Prior Publication Data

US 2017/0149919 A1   May 25, 2017

(51) Int. Cl.
*G10L 11/00* (2006.01)
*H04L 29/08* (2006.01)

(52) U.S. Cl.
CPC ........ *H04L 67/2842* (2013.01); *H04L 67/104* (2013.01); *H04L 67/1095* (2013.01)

(58) Field of Classification Search
CPC ............... G06F 17/30867; G06F 13/00; G06F 17/30241; G06F 2212/608; G06F 19/3406; G06F 19/3418; G06F 19/3462; G06F 12/0862; G06F 15/173; G06F 15/167; G06F 21/44; G06F 3/0604; G06F 3/0655; G06F 3/0673; G06F 9/3806; H04W 52/241

USPC ........... 704/251, 255, 250, 257, 270, 270.1, 704/1–10, 200; 370/338
See application file for complete search history.

(56) References Cited

U.S. PATENT DOCUMENTS

| 6,490,432 | B1 | 12/2002 | Wegener et al. |
| 6,836,825 | B2 | 12/2004 | Goff |
| 7,519,470 | B2 | 4/2009 | Brasche et al. |
(Continued)

FOREIGN PATENT DOCUMENTS

| WO | 2007047302 A3 | 4/2007 |
| WO | 2011143502 A2 | 11/2011 |

OTHER PUBLICATIONS

Lim et al. "Cache invalidation strategies for internet-based mobile ad hoc networks", from IDS.*
C.-Jen Wu., et al.,"A Scalable Server Architecture A Scalable Server Architecture for Mobile Presence Services in Social Network Applications", IEEE Transactions on Mobile Computing, vol. 12, No. 2, Feb. 2013, p. 1-13.
(Continued)

*Primary Examiner* — Huyen Vo
(74) *Attorney, Agent, or Firm* — Cantor Colburn LLP; Steven Chiu

(57) ABSTRACT

A method for sending data to a user device comprises establishing a communicative connection between a first user device and a server, receiving the data at the first user device, caching the data on the first user device, establishing a communicative connection between the first user device and a second user device, determining whether the first user device is moving out of communicative range with the second user device, sending the data from the first user device to the second user device responsive to determining that the first user device is moving out of communicative range with the second user device, and caching the data on the second user device.

15 Claims, 12 Drawing Sheets

(56) References Cited

U.S. PATENT DOCUMENTS

| | | | |
|---|---|---|---|
| 7,565,413 | B1 | 7/2009 | O'Toole, Jr. |
| 7,792,915 | B2 | 9/2010 | Berkey et al. |
| 7,945,694 | B2 | 5/2011 | Luzzatti et al. |
| 8,174,982 | B2 | 5/2012 | Buddhikot et al. |
| 8,175,584 | B2 | 5/2012 | Estevez et al. |
| 8,326,985 | B2 | 12/2012 | Luna et al. |
| 8,356,080 | B2 | 1/2013 | Luna et al. |
| 2002/0129116 | A1 | 9/2002 | Humphrey |
| 2012/0047565 | A1* | 2/2012 | Petersen ............ G06Q 30/0204 726/7 |
| 2013/0007186 | A1 | 1/2013 | Liu et al. |
| 2013/0103781 | A1* | 4/2013 | Mori .................... H04L 1/0084 709/213 |
| 2013/0191456 | A1 | 7/2013 | Ting et al. |
| 2014/0155093 | A1* | 6/2014 | Teller .................... H04W 4/025 455/456.3 |
| 2014/0335787 | A1* | 11/2014 | Smadi .................... H04L 67/06 455/41.2 |
| 2015/0120833 | A1 | 4/2015 | De Foy et al. |
| 2016/0037458 | A1* | 2/2016 | Ponnuswamy ..... H04W 52/241 370/338 |

OTHER PUBLICATIONS

H. Shen, et al.,"A Distributed Spatial-Temporal Similarity Data A Distributed Spatial-Temporal Similarity Data Storage Scheme in Wireless Sensor Networks", IEEE Transactions on mobile computing, vol. 10, No. 7, Jul. 2011, p. 1-15.

L. Yang, et al.,"Social Relation Based Cache Distribution Policy in Wireless Mobile Networks", Journal of Networks, vol. 9, No. 9 Sep. 2014, p. 1-10.

O. Krejcar, et al.,"Dataflow Optimization Using of WiFi, GSM, UMTS, BT and GPS positioning in Mobile Information Systems on Mobile Devices", Second International Conference on Computer Engineering and applications, 2010, pp. 1-5.

S. Lim, et al.,"Cache invalidation strategies for internet-based mobile ad hoc networks", Computer Communications, Science Direct, Mar. 2, 2007, p. 1-16.

T. Delot, et al.,"Multi-scale query processing in vehicular networks", Orginal Research, Springer—vol. 10, Jun. 5, 2011, p. 1-14.

Web Caching, Geoff Huston, Telstra, The Internet Protocol Journal—vol. 2, No. 3, 1999.

* cited by examiner

FILE REPLICATION ON LOCATION-AWARE DEVICES

BACKGROUND

The present invention generally relates to file replication, and more specifically, to file replication between location-aware mobile devices.

In typical systems, a mobile device connects to a server and may receive data files and other content from the server via an Internet connection. In some systems, a distributed, block-based, network cache or web cache may be used to reduce the time and bandwidth used to send content to mobile devices. For example, a network cache may be located in a wireless router, or other network device. The network cache stores copies of data passing through the network cache so that subsequent requests for the data may be sent from the network cache to the requesting device(s).

The use of a network cache is advantageous because the network cache is "closer" to the requesting devices, and thus, the data typically is received more quickly at the requesting devices. Further, the use of a network cache reduces the overall network bandwidth used to send the data, and reduces the load and demands on the server that originally sent the data.

SUMMARY

According to an embodiment of the present invention, a method for sending data to a user device comprises establishing a communicative connection between a first user device and a server, receiving the data at the first user device, caching the data on the first user device, establishing a communicative connection between the first user device and a second user device, determining whether the first user device is moving out of communicative range with the second user device, sending the data from the first user device to the second user device responsive to determining that the first user device is moving out of communicative range with the second user device, and caching the data on the second user device.

According to another embodiment of the present invention, a method for sending data to a user device comprises caching data on a first user device, establishing a communicative connection between the first user device and a second user device responsive to determining that a user of the second user device is interested in the data, sending the data from the first user device to the second user device responsive to establishing the communicative connection between the first user device and a second user device, and caching the data on the second user device.

According to yet another embodiment of the present invention, a computer program product comprising a computer readable storage medium having program instructions embodied therewith, the program instructions executable by a processor to cause the processor to perform a method that comprises establishing a communicative connection between a first user device and a server, receiving the data at the first user device, caching the data on the first user device, establishing a communicative connection between the first user device and a second user device, determining whether the first user device is moving out of communicative range with the second user device, sending the data from the first user device to the second user device responsive to determining that the first user device is moving out of communicative range with the second user device, and caching the data on the second user device.

DETAILED DESCRIPTION

The embodiments described herein provide a system and method for sending data to one or more mobile devices (location-aware devices). Though network caches are particularly useful for decreasing download times for data transfer, reducing network congestion, and reducing server loads, network caches are not always available, and may not have the storage capacity to store a useful amount of cached data in some environments. The methods and systems described herein provide for an integrated peer to peer network that may work with or without a network cache device to deliver data and content to one or more user devices.

Figure 1:
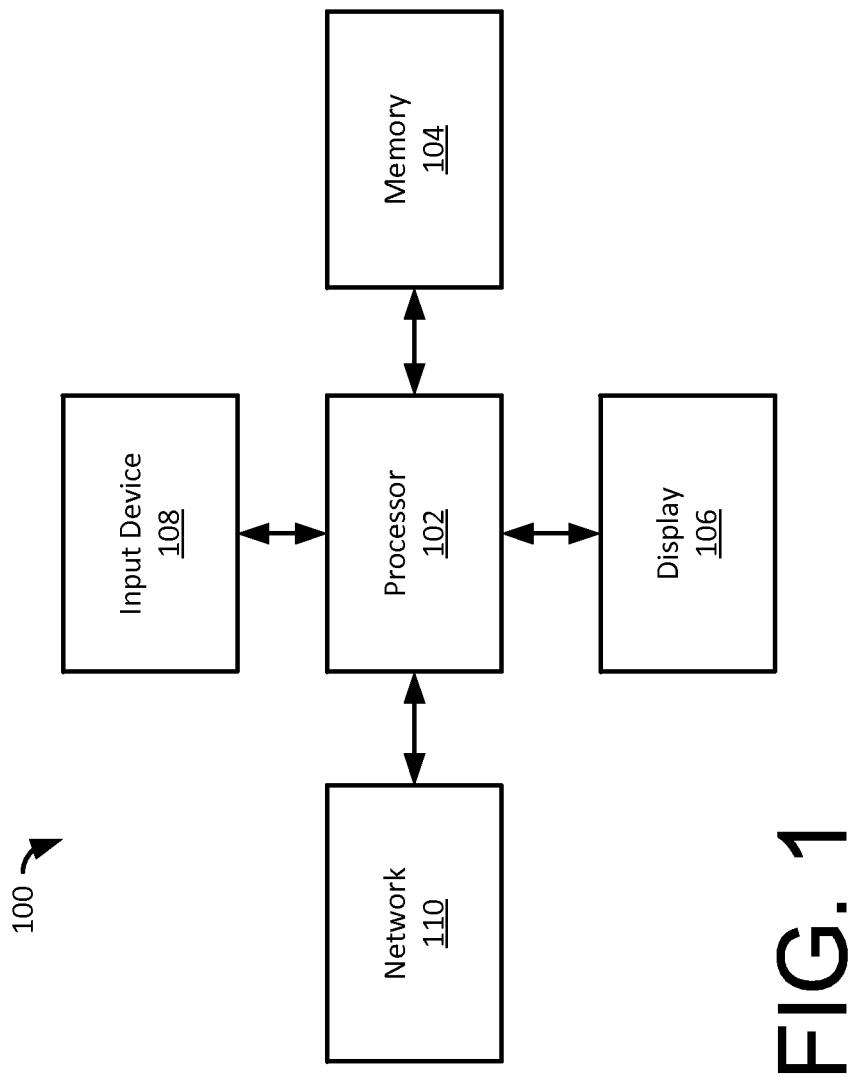
FIG. 1 illustrates a block diagram of an exemplary embodiment of a system.

FIG. 1 illustrates an exemplary embodiment of a system 100 that may be located in a user device (location aware device), a server, or a network/web cache device. The system 100 includes a processor 102 that is communicatively connected to a memory 104, a display 106, an input device 108, and a network 110.

Figure 2:
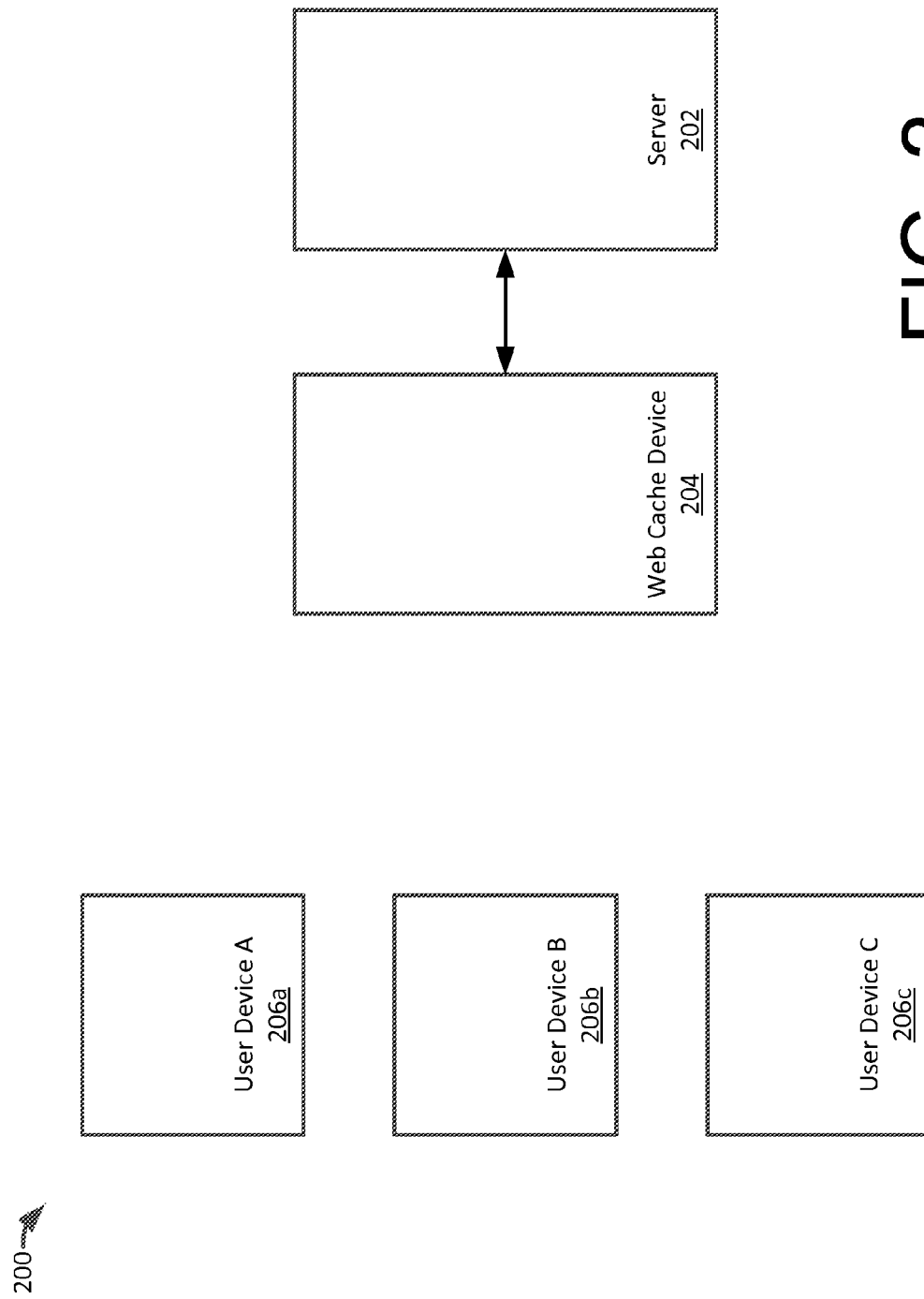
FIG. 2 illustrates a block diagram of an exemplary embodiment of a system.

FIG. 2 illustrates an exemplary embodiment of a system 200. The system 200 includes a server 202 that is communicatively connected to a network/web cache device 204 such as, for example, a router. Any number of user (mobile) devices 206 may be within range of the network/web cache device 204 to establish a wireless communicative connection between the user devices 206 and the network/web cache device 204. The user devices 206 may include software or hardware that allows the user devices 206 to determine their locations by, for example, using the global positioning system, or measuring signal strengths of signals received by the user devices 206. In some embodiments, only one of the user devices 206 may be within a distance to establish a communicative connection with the network/web cache device 204. In such an embodiment, the user devices 206 may establish a communicative connection (peer-to-peer) between user devices 206.

Figure 3:
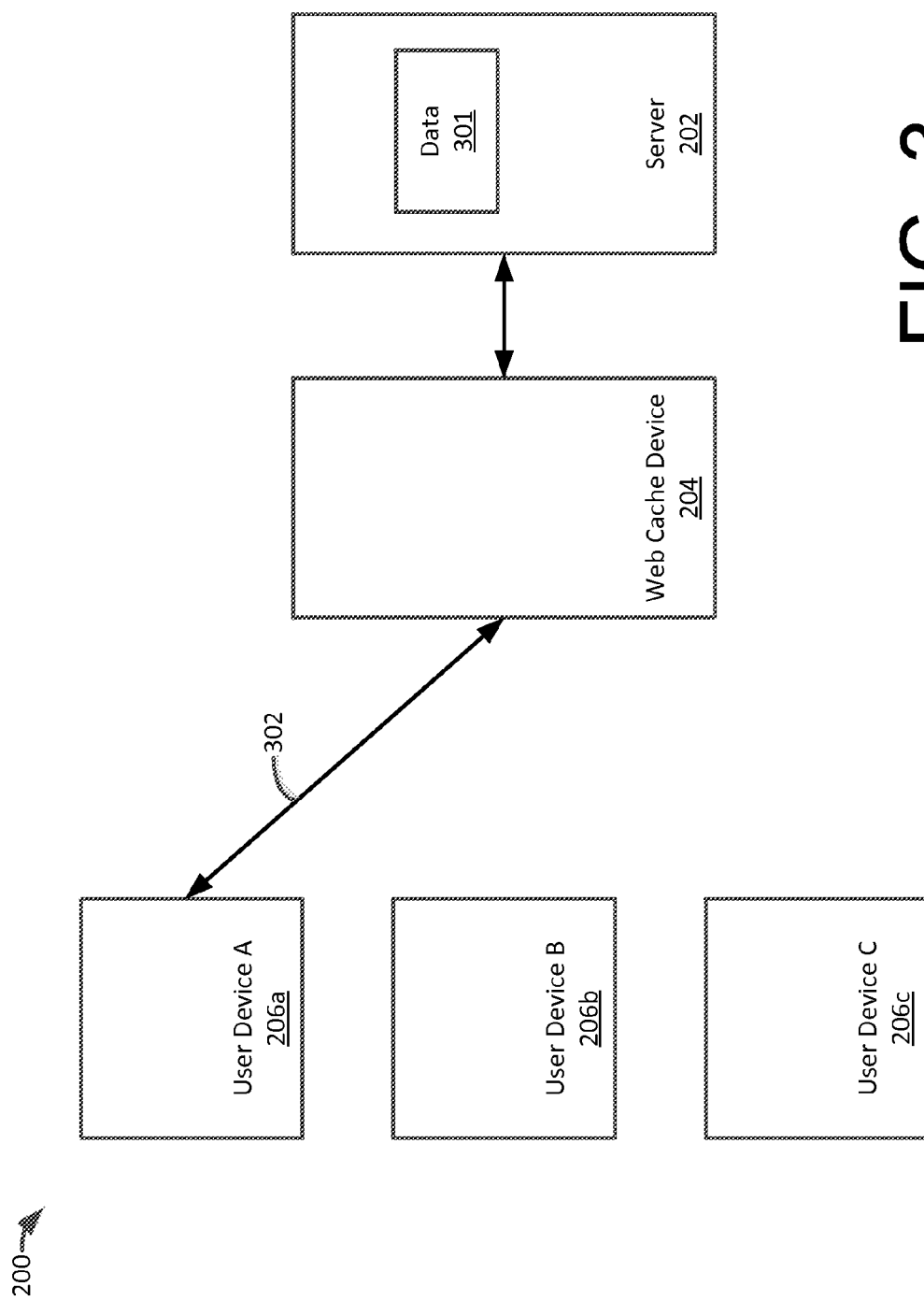
FIGS. 3-7 describe one exemplary method of operation of the system of FIG. 2.

FIGS. 3-7 describe one exemplary method of operation of the system 200. Referring to FIG. 3, the user device 206a establishes a communicative connection 302 between the user device 206a and the network/web cache device 204. The user device 206a requests content from the server 202. In the illustrated exemplary embodiment, the content is data 301 that may include any type of digital content such as, for example, html pages, video, audio, books, social media content, mobile applications, or any other data that may be received by a user device 206a. The data 301 may be segmented into data blocks, packets, or segments, which may be received in any order by the user device 206a and assembled by the user device 206a to result in a digital file that is usable by the user device 206a.

Figure 4:
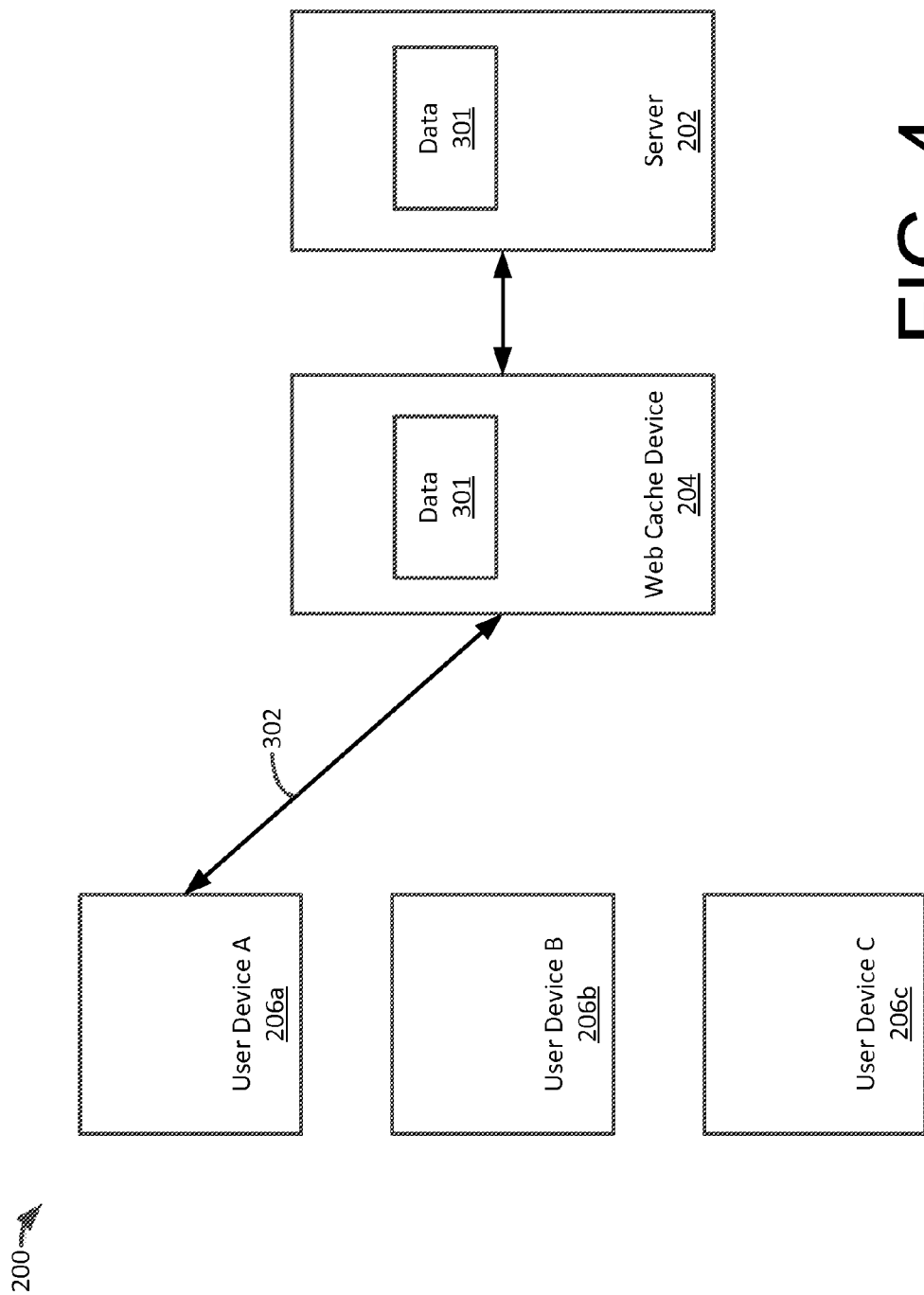

Referring to FIG. 4, after the user device 206a requests the data 301 the data 301 is received by the network/web cache device 204 and, in some embodiments, the data 301 or portions of the data 301 may be cached or stored in a memory of the network/web cache device.

Figure 5:
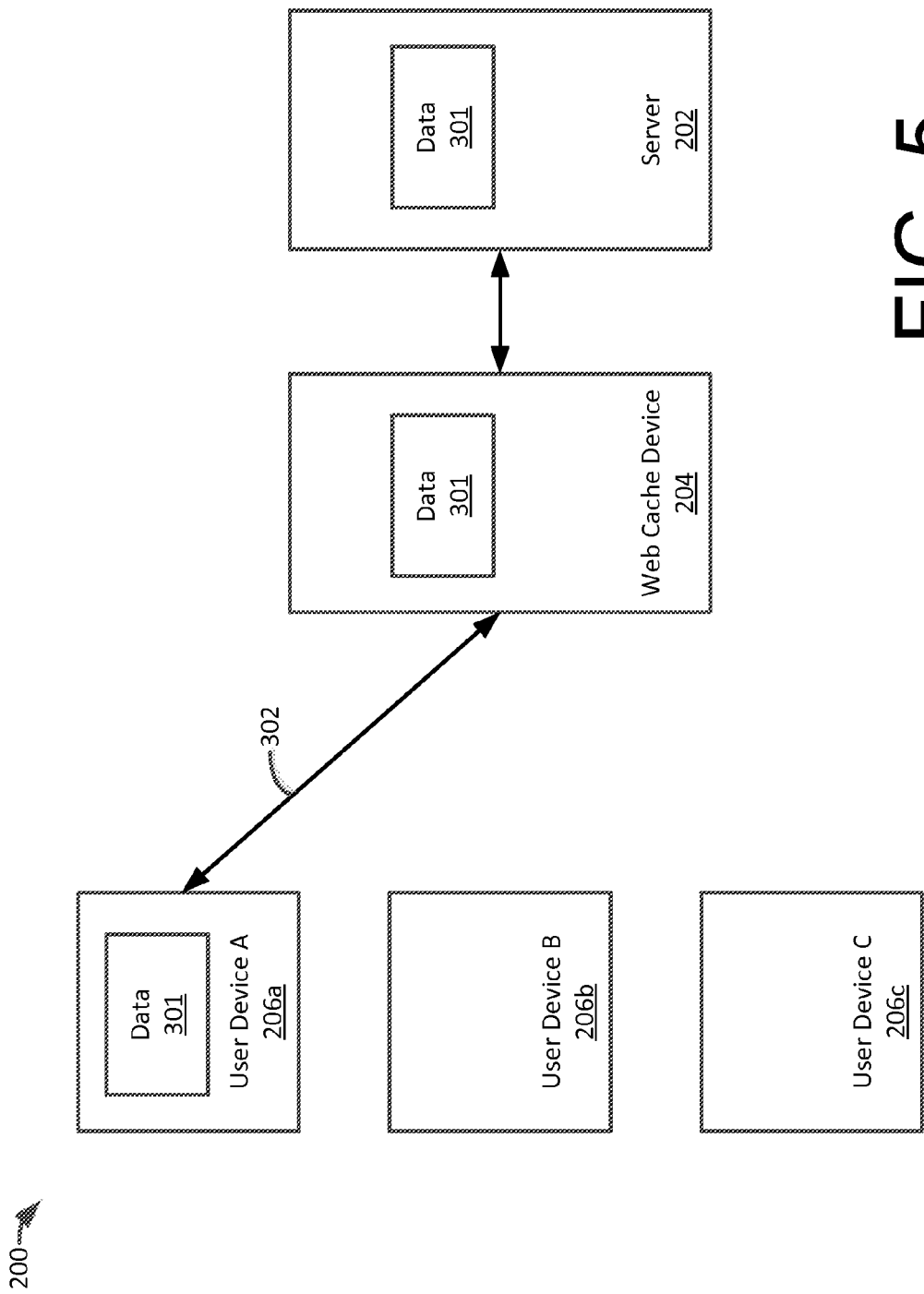

In FIG. 5, the user device 206a has received the data 301. The user device 206a may present the data 301 to the user on a display on the user device 206 in some embodiments. The user device 206a may also act as a network/web cache by caching the data 301 and making the data 301 available to other user devices 206 in the vicinity of the mobile device 206a.

Figure 6:
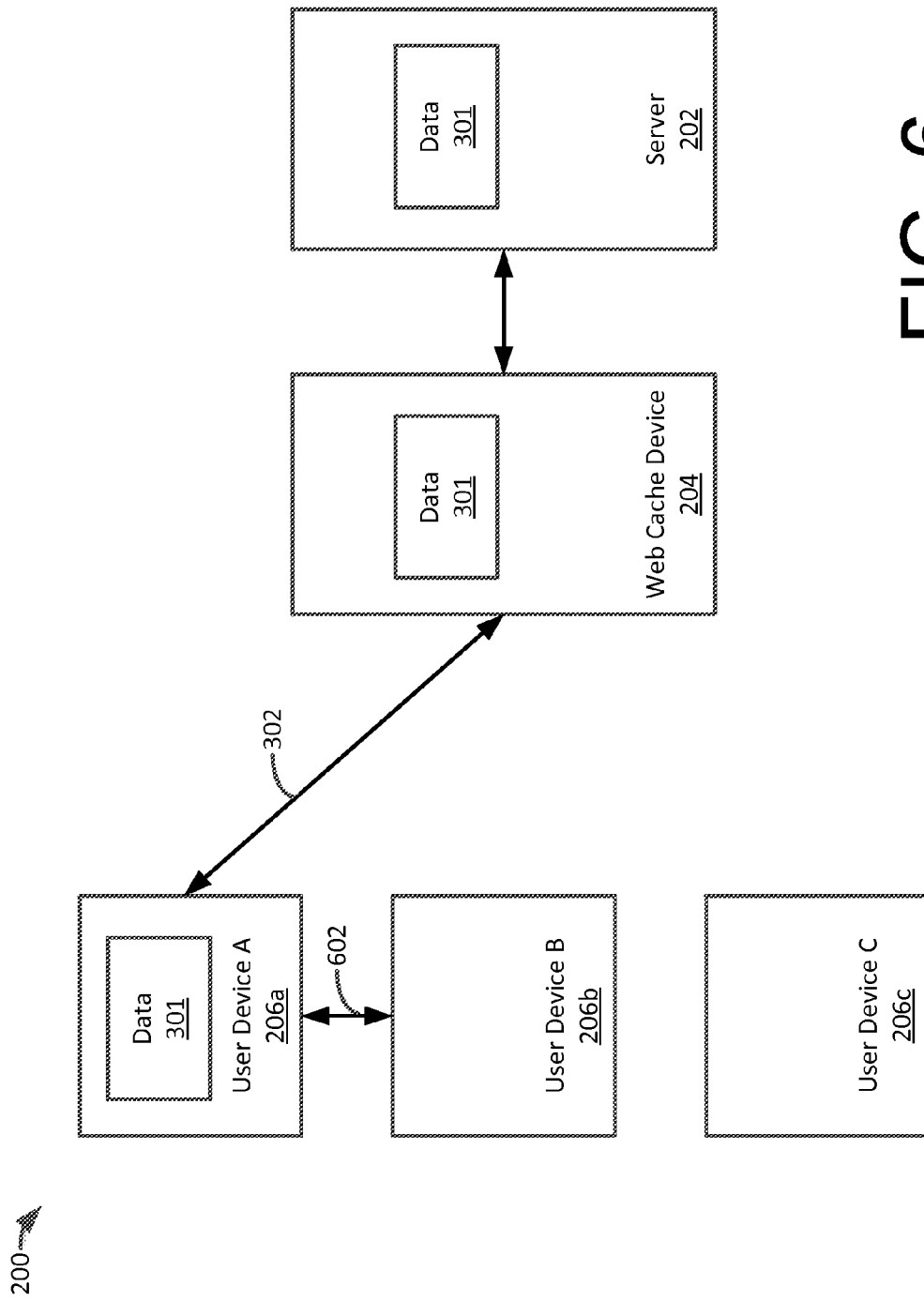

FIG. 6 illustrates the establishment of a communicative connection 602 between the user device 206a and the user device 206b. The communicative connection 602 may include any suitable type of wireless communication method.

Figure 7:
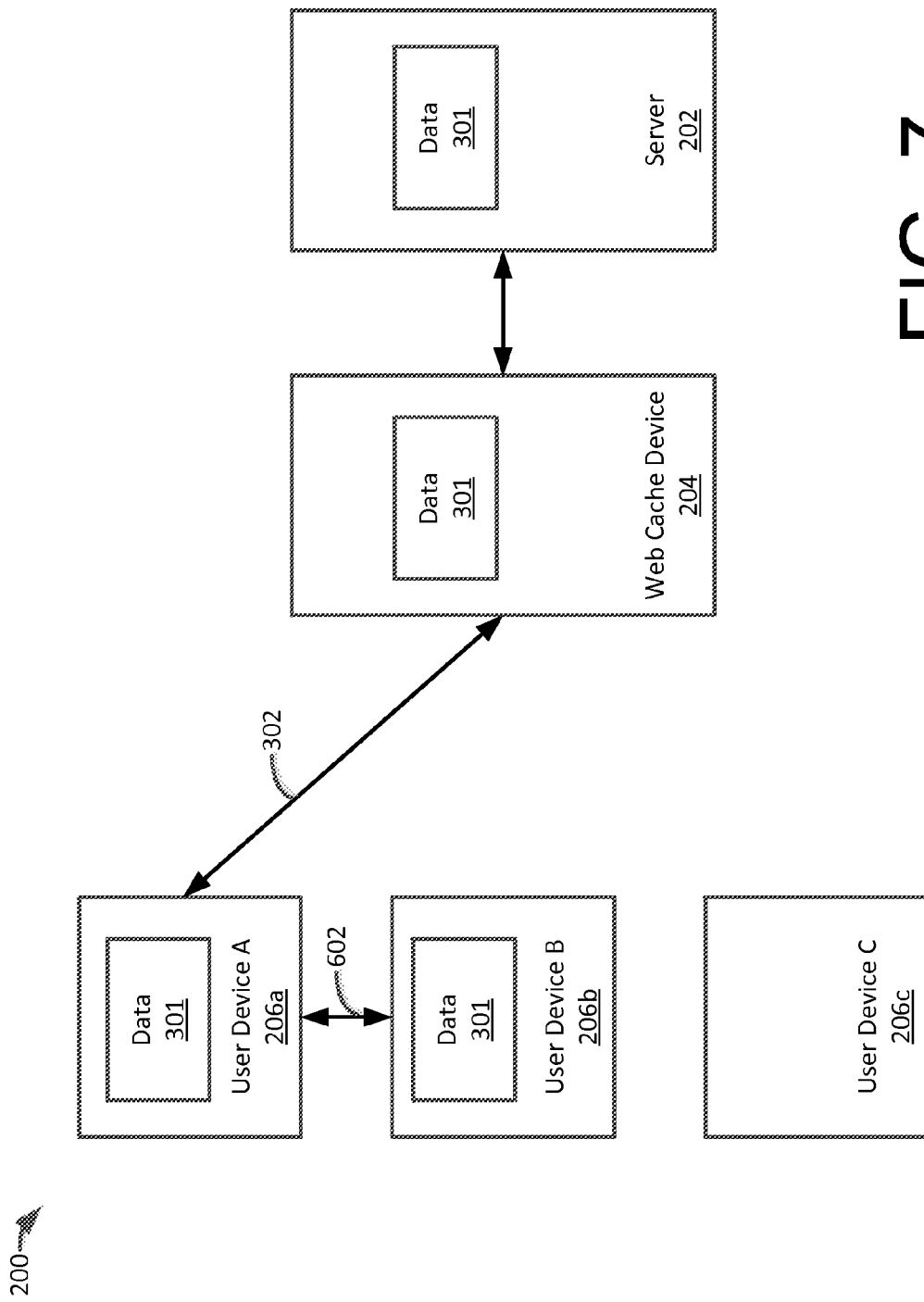

Once the communicative connection 602 is established. The user devices 206a and 206b may communicate and share data. In an exemplary embodiment, the user device 206a may send the user device 206b a list of the data cached on the user device 206a. Thus, if the user device 206b requests the data 301, user device 206b may request the data 301 directly from the user device 206a. FIG. 7 illustrates the movement of the data 301 from the user device 206a to the user device 206b via the communicative connection 602.

Figure 8:
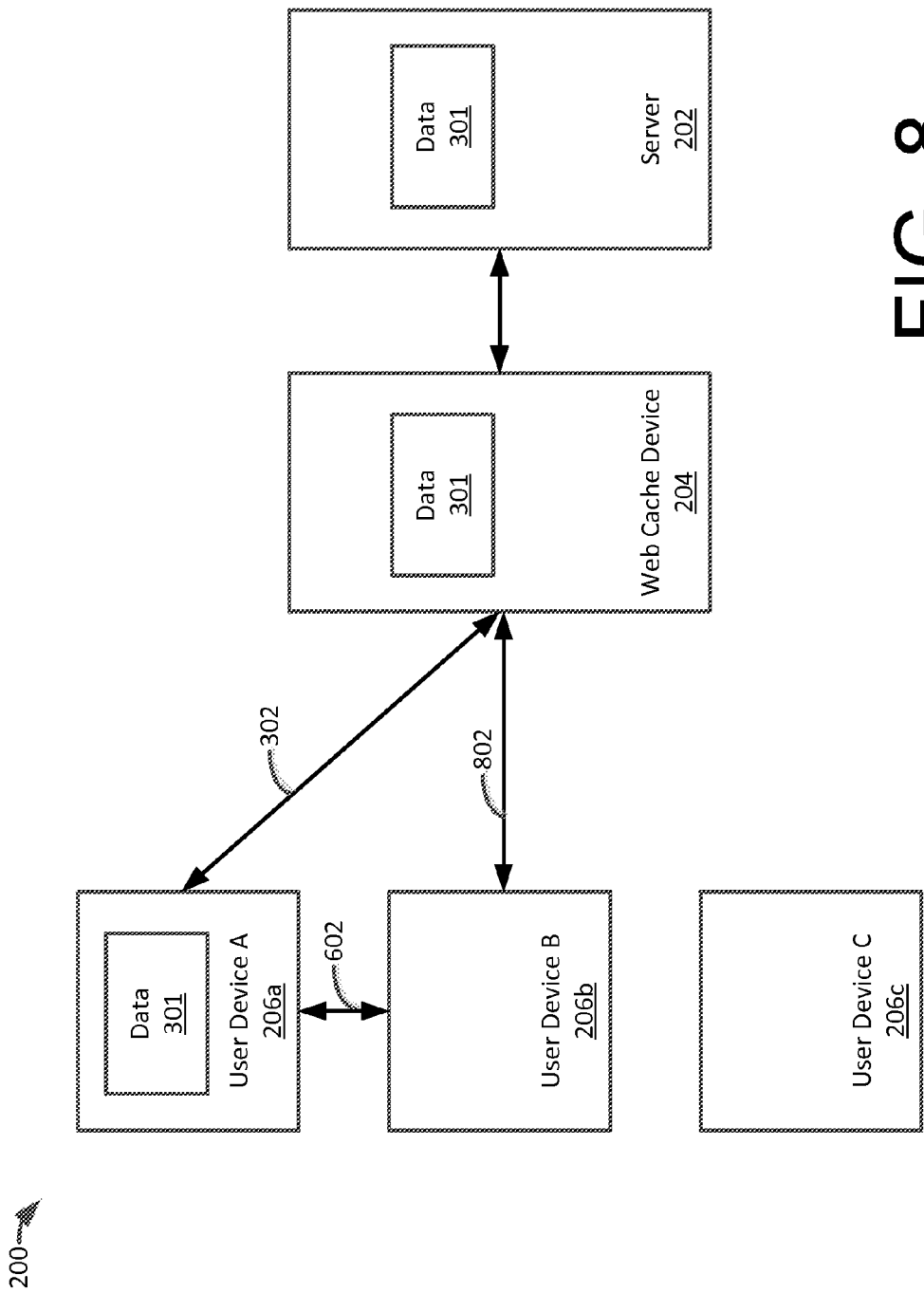
FIG. 8 illustrates another exemplary method that may be performed by the system of FIG. 2.

FIG. 8 illustrates another exemplary method that may be performed by the system 200. In this exemplary embodiment, the user device 206a has received the data from the network/web cache device 204 and the communicative connection 602 between the user device 206b and the user device 206a has been established. The user device 206b has established a communicative connection 802 with the network/web cache device 204. When the user device 206b requests the data 301, the user device 206b may receive portions of the data 301 from the network/web cache device 204 and the user device 206a. This may be facilitated using a peer-to-peer scheme that enables the data 301 to be sent as blocks that may be assembled by the user device 206b into the data 301.

Alternatively, the user device 206b may request the data 301 via the network/web cache device 204. The network/web cache device 204 may store a list of the data cached on the user device 206a such that the network/web cache device 204 is aware that the data 301 is cached on the user device 206a. The network/web cache device 204 may direct the user device 206b to establish the communicative connection 602 if necessary and further direct the user device 206b to request the data 301 from the user device 206a.

Figure 9:
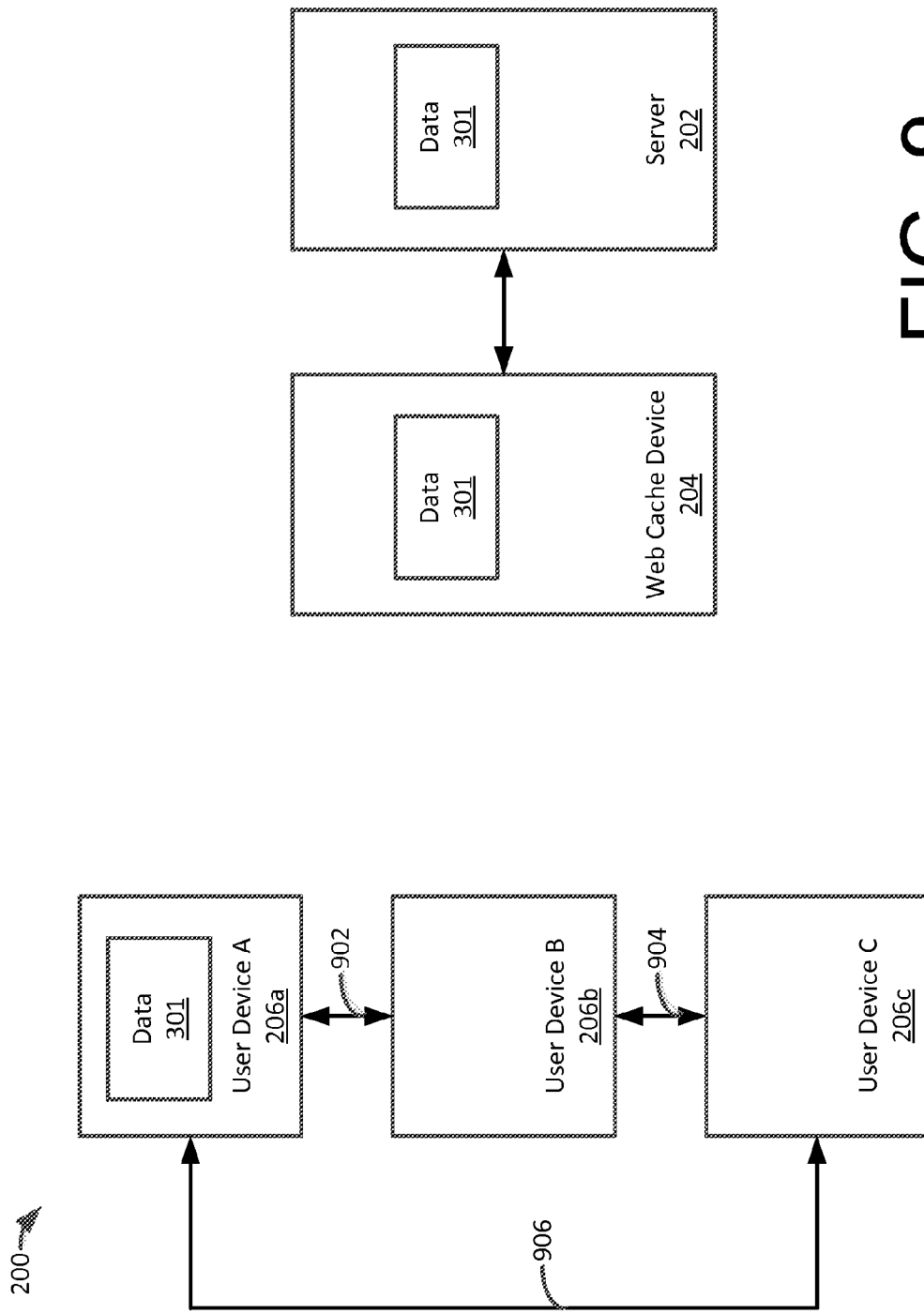
FIG. 9 illustrates yet another exemplary method where the user device has cached the data.

FIG. 9 illustrates yet another exemplary method where the user device 206a has cached the data 301. A communicative connection 902 has been established between the user device 206a and the user device 206b; a communicative connection 904 has been established between the user device 206b and 206c; and a communicative connection 906 has been established between the user device 206a and 206c. The communicative connections may be initiated between the user devices 206 that are within range of each other based on any number of factors. For example, the proximity of the user devices 206 to each other, if the users of the user devices 206 have similar interests based on, for example, interest graph data, user file histories, correlations between database access, previously existing group meetings or invitations, information regarding whether the users have attended similar meetings or online interest groups. Other factors or parameters that may be used to initiate connections between user devices 206 may include, for example, user devices 206 that have a large storage capacity, user devices 206 with users that are proximate to users of user devices 206 that have similar interest graphs, a directory of users who have elected to participate in sharing files, and user devices 206 of users that are likely to be efficient and useful caches. In this regard, such users may be identified by, for example, using location tracking to identify user devices 206 that travel over large distances, identifying user devices 206 that encounter many different wireless networks, identify user devices 206 that encounter large numbers of other user devices 206 (e.g., user devices 206 that are often proximate to other user devices 206).

In some exemplary embodiments the geographic location of the users may be associated with the data 301. For example, the data 301 may include advertising, event, or other geographically relevant information. In such an embodiment, it is beneficial for the data 301 to be cached on user devices 206 in the geographic location. Thus, referring to FIG. 9, the user device 206a has cached the data 301.

Figure 10:
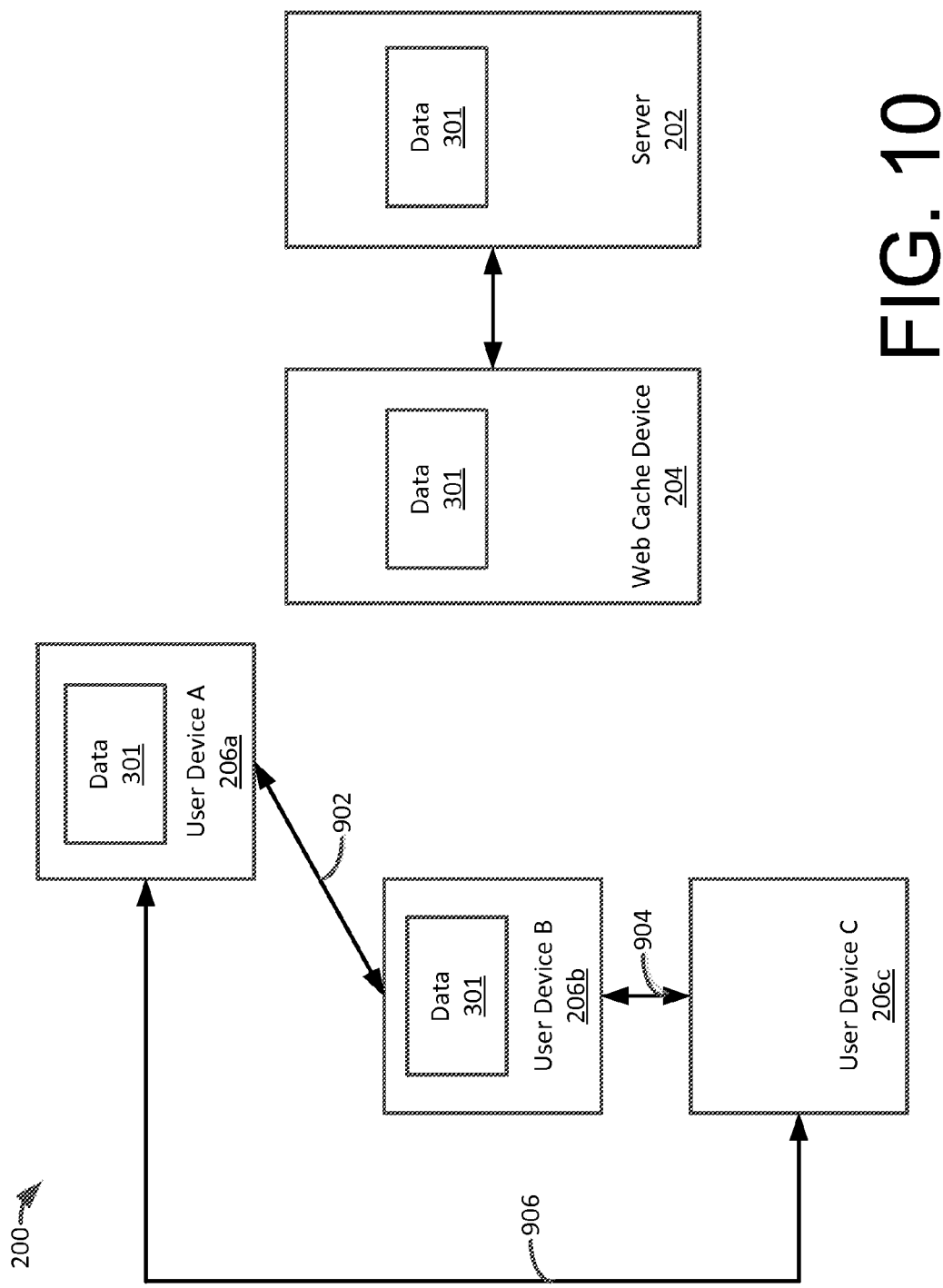
FIG. 10 illustrates a block diagram where the user device has begun moving away from the geographic location.

Referring to FIG. 10, the user device 206a has begun moving away from the geographic location, which can be determined by the user device 206a or other user devices 206 based on, for example, global positioning information and/or the strength of the signal of the communicative connections between the other user devices 206 and/or the network/web cache device 204. When the user device 206a is sensed or determines that the communicative connections 902 and 906 may be lost due to the increasing range of the connections 902 and 906, the user device 206a may send the data 301 to the user device 206b such that the data 301 remains in the geographic location. In other embodiments the actual geographic location may not be determined, but rather the relative distances between the user devices 206 such that when one user device begins to leave or starts to move away from the other user devices 206, the data 301 may be sent to at least one of the other user devices 206 before the communicative connections between the devices are disconnected.

Figure 11:
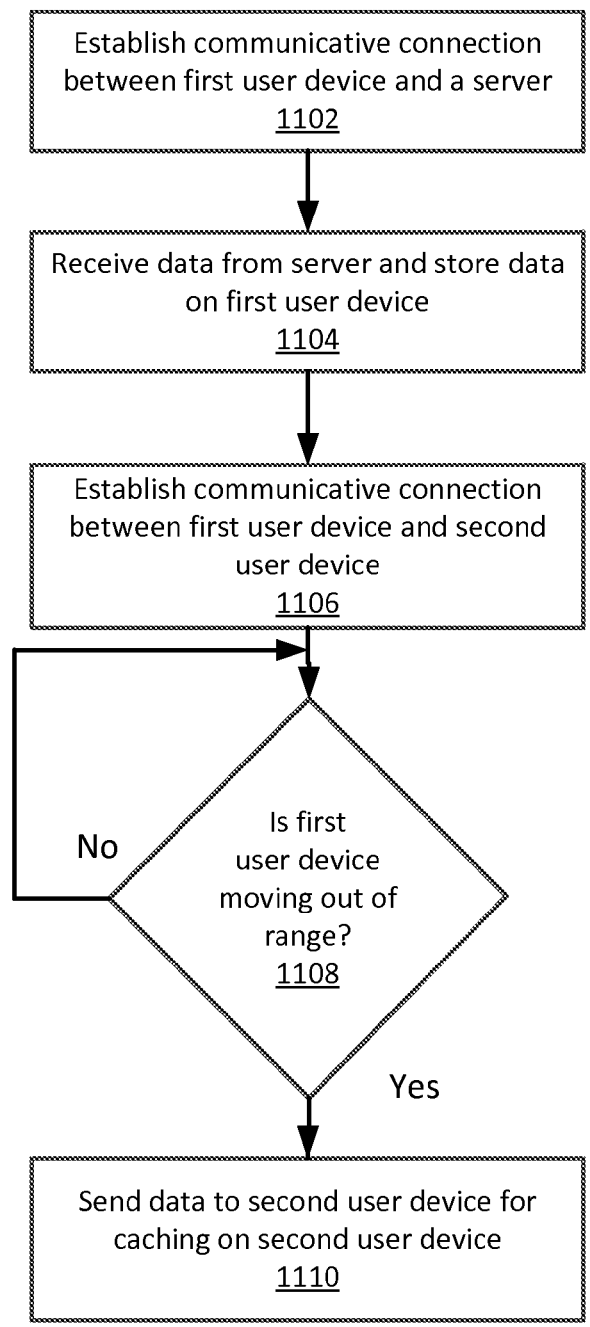
FIG. 11 illustrates a flow diagram of an exemplary method of operation of the system of FIG. 2.

FIG. 11 illustrates a flow diagram of an exemplary method of operation of the system 200 (of FIG. 2). In block 1102, a communicative connection is established between a first user device 206a and the server 202. In block 1104 data is sent from the server 202 and received by the first user device 206a. A communicative connection is established between the first user device 206a and a second user device 206b in block 1106. In block 1108, the first user device determines whether the first user device is moving out of a maximum range for the communicative connection between the first user device 206a and the second user device 206b. If yes, in block 1110, the data is sent by the first user device 206a to the second user device 206b for caching on the second user device 206a.

Figure 12:
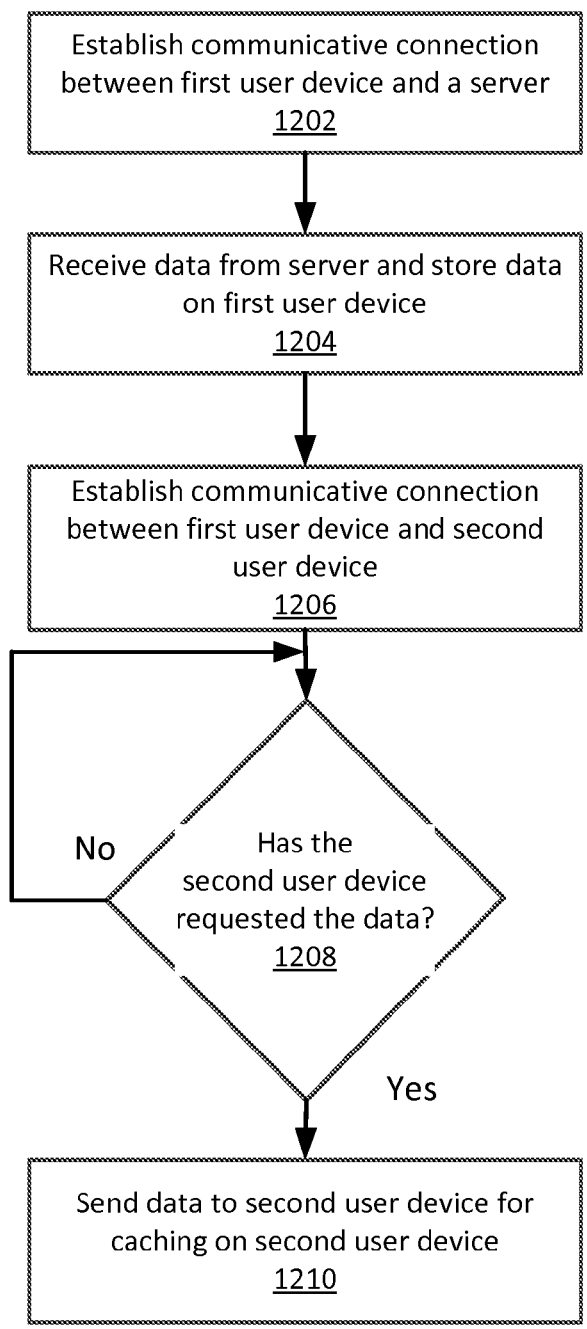
FIG. 12 illustrates a flow diagram of another exemplary method of operation of the system of FIG. 2.

FIG. 12 illustrates a flow diagram of another exemplary method of operation of the system 200 (of FIG. 2). In block 1202, a communicative connection is established between a first user device 206a and the server 202. In block 1204 data is sent from the server 202 and received by the first user device 206a. A communicative connection is established between the first user device 206a and a second user device 206b in block 1206. In block 1208, the first user device determines whether the second user device 206b has requested the data, the request may include a request to the server 202, the network/web cache device 204, or the first user device 206a. If the request is sent by the second user device 206b, the second user device 206b may be notified by, for example, the network/web cache device 204 or the server 202 to pull (i.e., request) the data from the user device 206a or another user device that may store a portion or all of the data. Alternatively, in some embodiments the user device 206a or 206c may be notified to push (i.e., send) the data to the user device 206b. If yes, in block 1110, the data is sent by the first user device 206a to the second user device 206b for caching on the second user device 206a.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for sending a data to a user device, the method comprising:
   establishing a communicative connection between a first user device and a server;
   receiving the data at the first user device, wherein the data is associated with a geographic location of the first user device;
   caching the data on the first user device;
   determining whether the first user device and a second user device are associated with users having similar interest graphs prior to establishing the communicative connection between the first user device and the second user device, wherein the determination that the users have similar interest graphs is based on a determination that the users have similar user file histories and have correlations between database accesses;
   establishing a direct peer-to-peer communicative network connection operative to send the data between a first user device and the second user device responsive to determining that the first user device and the second user device are associated with users having similar interest graphs;
   sending a notification from the first user device to the second user device that indicates that the data is cached on the first user device following establishing the communicative connection between the first user device and a second user device;
   determining that the first user device is moving out of the geographic location by determining that a signal strength of a signal received by the first user device is indicative of the first user device moving out of communicative range with the second user device;
   sending the data from the first user device to the second user device responsive to determining that the first user device is moving out of the geographic location and that the second user device is within the geographic location; and
   caching the data on the second user device.

2. The method of claim 1, wherein the first user device sends a first portion of the data to the second user device.

3. The method of claim 2, further comprising:
   establishing a communicative connection between the second user device and the server; and
   sending a second portion of the data from the server to the second user device.

4. The method of claim 1, wherein the data is cached on a network cache device prior to the first user device receiving the data.

5. The method of claim 4, wherein a portion of the data is sent to the second user device from the first user device and a portion of the data is sent to the second user device from the network cache.

6. A method for sending data to a user device, the method comprising:
   caching data on a first user device, wherein the data is associated with a geographic location of the first user device;
   determining whether the first user device and a second user device are associated with users having similar interest graphs prior to establishing the communicative connection between the first user device and the second user device, wherein the determination that the users have similar interest graphs is based on a determination that the users have similar user file histories and have correlations between database accesses;
   establishing a direct peer-to-peer communicative network connection operative to send the data between the first user device and the second user device responsive to determining that the first user device and the second user device are associated with users having similar interest graphs;
   sending a notification from the first user device to the second user device that indicates that the data is cached on the first user device following establishing the communicative connection between the first user device and a second user device;
   determining that the first user device is moving out of the geographic location by determining that a signal strength of a signal received by the first user device is indicative of the first user device moving out of communicative range with the second user device;
   sending the data from the first user device to the second user device responsive to determining that the first user device is moving out of the geographic location and that the second user device is within the geographic location; and
   caching the data on the second user device.

7. The method of claim 6 further comprising:
establishing a communicative connection between the first user device and a server; and
receiving the data at the first user device prior to caching the data on the first user device.

8. The method of claim 6, wherein the first user device sends a first portion of the data to the second user device.

9. The method of claim 8, further comprising:
establishing a communicative connection between the second user device and the server; and
sending a second portion of the data from the server to the second user device.

10. The method of claim 6, wherein the data is cached on a network cache device prior to the first user device receiving the data.

11. A computer program product comprising a non-transitory computer readable storage medium having program instructions embodied therewith, the program instructions executable by a processor to cause the processor to perform a method comprising:
establishing a communicative connection between a first user device and a server;
receiving the data at the first user device, wherein the data is associated with a geographic location of the first user device;
caching the data on the first user device;
determining whether the first user device and a second user device are associated with users having similar interest graphs prior to establishing the communicative connection between the first user device and the second user device, wherein the determination that the users have similar interest graphs is based on a determination that the users have similar user the histories and have correlations between database accesses;
establishing a direct peer-to-peer communicative network connection operative to send the data between the first user device and the second user device responsive to determining that the first user device and the second user device are associated with users having similar interest graphs;
sending a notification from the first user device to the second user device that indicates that the data is cached on the first user device following establishing the communicative connection between the first user device and a second user device;
determining that the first user device is moving out of the geographic location by determining that a signal strength of a signal received by the first user device is indicative of the first user device moving out of communicative range with the second user device;
sending the data from the first user device to the second user device responsive to determining that the first user device is moving out of the geographic location and that the second user device is within the geographic location; and
caching the data on the second user device.

12. The computer program product of claim 11, wherein the first user device sends a first portion of the data to the second user device.

13. The computer program product of claim 12, the method further comprising:
establishing a communicative connection between the second user device and the server; and
sending a second portion of the data from the server to the second user device.

14. The computer program product of claim 11, wherein the data is cached on a network cache device prior to the first user device receiving the data.

15. The computer program product of claim 14, wherein a portion of the data is sent to the second user device from the first user device and a portion of the data is sent to the second user device from the network cache.

* * * * *